United States Patent
Kim et al.

(10) Patent No.: US 9,525,165 B2
(45) Date of Patent: Dec. 20, 2016

(54) ELECTRODE FOR RECHARGEABLE LITHIUM BATTERY AND RECHARGEABLE LITHIUM BATTERY INCLUDING THE SAME

(75) Inventors: Jong-Man Kim, Yongin-si (KR); Ho-Yul Baek, Yongin-si (KR); Jae-Rok Kim, Yongin-si (KR); Jake Kim, Yongin-si (KR); Kyeong-Beom Cheong, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 757 days.

(21) Appl. No.: 13/188,403

(22) Filed: Jul. 21, 2011

(65) Prior Publication Data
US 2012/0231336 A1    Sep. 13, 2012

Related U.S. Application Data

(60) Provisional application No. 61/450,074, filed on Mar. 7, 2011.

(51) Int. Cl.
*H01M 4/62* (2006.01)
*H01M 4/131* (2010.01)
(Continued)

(52) U.S. Cl.
CPC .............. *H01M 4/131* (2013.01); *H01M 4/133* (2013.01); *H01M 4/136* (2013.01); *H01M 4/621* (2013.01); *H01M 4/623* (2013.01); *Y02E 60/122* (2013.01)

(58) Field of Classification Search
CPC ....................................................... H01M 4/62
(Continued)

(56) References Cited

U.S. PATENT DOCUMENTS 4,707,422 A * 11/1987 de Neufville et al. ......... 429/48
5,151,162 A    9/1992 Müller et al.
(Continued)

FOREIGN PATENT DOCUMENTS

CN      101663782 A     3/2010
JP      3-15175         1/1991
(Continued)

OTHER PUBLICATIONS

Nafion 117.*
(Continued)

*Primary Examiner* — Patrick Ryan
*Assistant Examiner* — Alex Usyatinsky
(74) *Attorney, Agent, or Firm* — Lewis Roca Rothgerber Christie LLP

(57) ABSTRACT

An electrode for a rechargeable lithium battery includes an electrode active material and a copolymer represented by

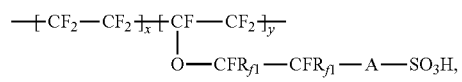

where A is selected from $-O-(CFR_{f3}-CFR_{f4})-$, $-(CFR_{f4}-CFR_{f5})-$ and combinations thereof, each of $R_{f1}$ through $R_{f5}$ is independently selected from fluorine, C1-C4 alkyls and C1-C4 fluorinated alkyls, and each of x and y is an integer ranging from 1 to 100,000.

14 Claims, 4 Drawing Sheets

(51) Int. Cl.
*H01M 4/133* (2010.01)
*H01M 4/136* (2010.01)

(58) Field of Classification Search
USPC ............... 429/212, 246, 144, 217, 231.8
See application file for complete search history.

(56) References Cited

U.S. PATENT DOCUMENTS

| | | | |
|---|---|---|---|
| 5,696,889 A | 12/1997 | Morikawa | |
| 6,544,689 B1 * | 4/2003 | Riley | H01M 6/168 252/62.2 |
| 6,632,561 B1 | 10/2003 | Bauer et al. | |
| 8,354,189 B2 * | 1/2013 | Pham | H01M 4/134 429/209 |
| 2002/0076608 A1 * | 6/2002 | Kamisuki et al. | 429/101 |
| 2003/0143467 A1 | 7/2003 | Riley et al. | |
| 2004/0131944 A1 | 7/2004 | Visco et al. | |
| 2005/0118508 A1 * | 6/2005 | Yong | H01M 2/1673 429/246 |
| 2007/0060708 A1 | 3/2007 | Wang et al. | |
| 2008/0318132 A1 | 12/2008 | Visco et al. | |
| 2010/0209779 A1 * | 8/2010 | Wendman | 429/310 |

FOREIGN PATENT DOCUMENTS

| | | |
|---|---|---|
| JP | 9-65153 | 3/1997 |
| JP | 11-097027 | 4/1999 |
| JP | 11-214009 | 8/1999 |
| JP | 11-339808 | 12/1999 |
| JP | 2001-503910 | 3/2001 |
| JP | 2006-324179 | 11/2006 |
| JP | 2010-518581 | 5/2010 |
| KR | 10-0688402 | 3/2007 |
| KR | 10-2008-0058374 | 6/2008 |
| WO | WO 98/20573 A1 | 5/1998 |
| WO | WO 01/29915 A2 | 4/2001 |
| WO | WO 2008/097723 A1 | 8/2008 |

OTHER PUBLICATIONS

Chem. Rev. 2004, 104, 4535-4585.*
Garsuch, R. R., et al., "Studies of Lithium-Exchanged Nafion as an Electrode Binder for Alloy Negatives in Lithium-Ion Batteries", Journal of the Electrochemical Society, 155(10) A721-A724 (2008).
Extended European Search Report dated Oct. 7, 2011 for Application No. 11175870.2, 7 pages.
Nasef et al.; Adsorption of some heavy metal ions from aqueous solutions on Nafion 117 membrane; Desalination 249 (2009) pp. 677-681.
SIPO Office action dated Apr. 21, 2015, with English translation, for corresponding Chinese Patent application 201110403974.0, (14 pages).
Haubold, H.G., et al, *Nano structure of NAFION: a SAXS study*, Electrochimica Acta 46, (2001) pp. 1559-1563.
English machine translation of Japanese Publication 11-097027 dated Apr. 9, 1999, listed above, (10 pages).
English machine translation of Japanese Publication 11-214009 dated Aug. 6, 1999, listed above, (14 pages).
English machine translation of Japanese Publication 2006-324179 dated Nov. 30, 2006, listed above, (16 pages).
SIPO Office action dated Dec. 14, 2015, with English translation, corresponding to Chinese Patent application 201110403974.0, (21 pages).
English machine translation of Japanese Publication 11-339808 dated Dec. 10, 1999, listed above, (6 pages).

* cited by examiner

ELECTRODE FOR RECHARGEABLE LITHIUM BATTERY AND RECHARGEABLE LITHIUM BATTERY INCLUDING THE SAME

CROSS-REFERENCE TO RELATED APPLICATIONS

This application claims priority to and the benefit of U.S. Provisional Application No. 61/450,074, filed on Mar. 7, 2011, in the United States Patent and Trademark Office, the entire content of which is incorporated herein in by reference.

BACKGROUND

1. Field

The disclosure relates to electrodes for rechargeable lithium batteries and to rechargeable lithium batteries including the electrodes.

2. Description of the Related Art

Batteries transform the chemical energy generated from electrochemical redox reactions of a chemical material into electrical energy. Such batteries are divided into primary batteries, which should be discarded after consuming all the energy, and rechargeable batteries, which can be recharged many times. Rechargeable batteries can be charged/discharged many times based on the reversible transformation between chemical energy and electrical energy.

Recent developments in the high-tech electronic industry have yielded smaller, lighter weight electronic devices, thereby leading to increased uses for portable electronic devices. Portable electronic devices are increasingly requiring batteries with high energy density as power sources. Accordingly, research into lithium rechargeable batteries is being actively pursued.

In general, an electrode for a rechargeable lithium battery is fabricated by mixing an electrode active material, a binder, and a conductive agent to prepare a slurry, coating the slurry on a substrate, and then drying and compressing the coated substrate. The binder has conventionally included polyvinylidene fluoride or styrene-butadiene rubber.

SUMMARY OF THE INVENTION

According to some embodiments of the present invention, an electrode for a rechargeable lithium battery improves the cycle-life characteristic of the battery.

In other embodiments of the present invention, a rechargeable lithium battery includes the electrode.

In yet other embodiments of the present invention, an electrode for a rechargeable lithium battery includes an ionomer represented by a copolymer of a monomer represented by Chemical Formula 1.

Chemical Formula 1

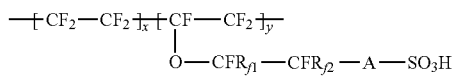

In Chemical Formula 1, each of x and y is independently an integer ranging from 1 to 100,000, and A is selected from —O—$(CFR_{f3}$—$CFR_{f4})$—, —$(CFR_{f5}$—$CFR_{f6})$—, and combinations of two or more thereof. Each of $R_{f1}$ to $R_{f6}$ is independently selected from fluorine, C1-C4 alkyls and C1-C4 fluorinated alkyls. For example, in some embodiments, each of $R_{f1}$ to $R_{f6}$ is independently selected from fluorine, $CH_3$ and $CF_3$. In some exemplary embodiments, A may be a combination of two or more of —O—$(CFR_{f3}$—$CFR_{f4})$—, —$(CFR_{f5}$—$CFR_{f6})$—. In some embodiments, for example, the monomer of Chemical Formula 1 is represented by Chemical Formula 2:

Chemical Formula 2

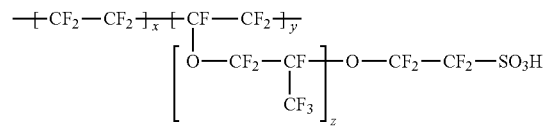

In Chemical Formula 2, A (from Chemical Formula 1) is —[O—$(CF_2$—$CFCF_3)]_{z-1}$—[O—$(CF_2$—$CF_2)]$—, $R_{f1}$ is F, and $R_{f2}$ is $CF_3$. Also, in some embodiments, in Chemical Formula 2, x is an integer ranging from 3 to 20, y is an integer ranging from 1 to 10, and z is an integer ranging from 1 to 10. In some embodiments, for example, x may range from 6 to 15, y may range from 1 to 5, and z may range from 1 to 5.

Nonlimiting examples of suitable materials for the ionomer include Nafion N1110 (available from Dupont Co.), Nafion N117 (available from Dupont Co.), Nafion N115 (available from Dupont Co.), Nafion NR-212 (available from Dupont Co.), Nafion NR-211 (available from Dupont Co.), Nafion XL-100 (available from Dupont Co.), Nafion NR50 1100 EW (available from Dupont Co.), and combinations thereof.

The electrode includes a current collector and an active material layer, and the ionomer may be included in the active material layer. The ionomer may be included in an amount of 0.1 to 10 parts by weight based on 100 parts by weight of the active material.

The electrode may be a positive electrode or a negative electrode. When the electrode is a positive electrode, the active material layer may include a positive active material selected from $Li_aA_{1-b}R_bD_2$ (where 0.90≤a≤1.8 and 0≤b≤0.5); $Li_aE_{1-b}R_bO_{2-c}D_c$ (where 0.90≤a≤1.8, 0≤b≤0.5 and 0≤c≤0.05); $LiE_{2-b}R_bO_{4-c}D_c$ (where 0≤b≤0.5, 0≤c≤0.05); $Li_aNi_{1-b-c}Co_bR_cD_\alpha$ (where 0.90≤a≤1.8, 0≤b≤0.5, 0≤c≤0.05 and 0<α≤2); $Li_aNi_{1-b-c}Co_bR_cO_{2-\alpha}Z_\alpha$ (where 0.90≤a≤1.8, 0≤b≤0.5, 0≤c≤0.05 and 0≤α≤2); $Li_aNi_{1-b-c}Co_bR_cO_{2-\alpha}Z_2$ (where 0.90≤a≤1.8, 0≤b≤0.5, 0≤c≤0.05 and 0<α<2); $Li_aNi_{1-b-c}Mn_bR_cD_\alpha$ (where 0.90≤a≤1.8, 0≤b≤0.5, 0≤c≤0.05 and 0<α≤2); $Li_aNi_{1-b-c}Mn_bR_cO_{2-\alpha}Z_\alpha$ (where 0.90≤a≤1.8, 0≤b≤0.5, 0≤c≤0.05 and 0<α<2); $Li_aNi_{1-b-c}Mn_bR_cO_{2-\alpha}Z_2$ (where 0.90≤a≤1.8, 0≤b≤0.5, 0≤c≤0.05 and 0<α<2); $Li_aNi_bE_cG_dO_2$ (where 0.90≤a≤1.8, 0≤b≤0.9, 0≤c≤0.5 and 0.001≤d≤0.1); $Li_aNi_bCo_cMn_dG_eO_2$ (where 0.90≤a>1.8, 0≤b≤0.9, 0≤c≤0.5, 0≤d≤0.5 and 0.001≤e≤0.1); $Li_aNiG_bO_2$ (where 0.90≤a≤1.8 and 0.001≤b≤0.1); $Li_aCoG_bO_2$ (where 0.90≤a≤1.8 and 0.001≤b≤0.1); $Li_aMnG_bO_2$ (where 0.90≤a≤1.8 and 0.001≤b≤0.1); $Li_aMn_2G_bO_4$ (where 0.90≤a≤1.8 and 0.001≤b≤0.1); $QO_2$; $QS_2$; $LiQS_2$; $V_2O_5$; $LiV_2O_5$; $LiTO_2$; $LiNiVO_4$; $Li_{3-f}J_2(PO_4)_3$ (where 0≤f≤2); $Li_{(3-f)}Fe_2(PO_4)_3$ (where 0≤f≤2); $LiFePO_4$; and combinations thereof.

In the above formulae for the positive active material, A may be selected from Ni, Co, Mn, and combinations thereof; R may be selected from Al, Ni, Co, Mn, Cr, Fe, Mg, Sr, V, rare earth elements, and combinations thereof; D may be selected from O, F, S, P, and combinations thereof; E may be selected from Co, Mn, and combinations thereof; Z may be selected from F, S, P, and combinations thereof; G may be selected from Al, Cr, Mn, Fe, Mg, La, Ce, Sr, V, and combinations thereof; Q may be selected from Ti, Mo, Mn, and combinations thereof; T may be selected from Cr, V, Fe, Sc, Y, and combinations thereof; and J may be selected from V, Cr, Mn, Co, Ni, Cu, and combinations thereof.

In some embodiments, when the electrode is a positive electrode, a lithium manganese-based oxide as a positive active material may be included in the active material layer.

When the electrode is a negative electrode, the active material layer may include a negative active material selected from crystalline carbon: amorphous carbon; lithium metal alloys including lithium alloyed with at least one metal selected from Na, K, Rb, Cs, Fr, Be, Mg, Ca, Sr, Si, Sb, Pb, In, Zn, Ba, Ra, Ge, Al, or Sn, Si, $SiO_x$ (where $0<x<2$), Si-Q alloys (where Q is an element selected from alkali metals, alkaline-earth metals, group 13 elements, group 14 elements, transition elements, rare earth elements, and combinations thereof, but Q is not Si), Sn, $SnO_2$, Sn—R alloys (where R is an element selected from alkali metals, alkaline-earth metals, group 13 elements, group 14 elements, transition elements, rare earth elements, and combinations thereof, but R is not Sn); and combinations thereof.

According to other embodiments of the present invention, a rechargeable lithium battery includes the aforementioned electrode, and a non-aqueous electrolyte. The rechargeable lithium battery may have improved cycle-life characteristics.

DETAILED DESCRIPTION OF THE INVENTION

Figure 1:
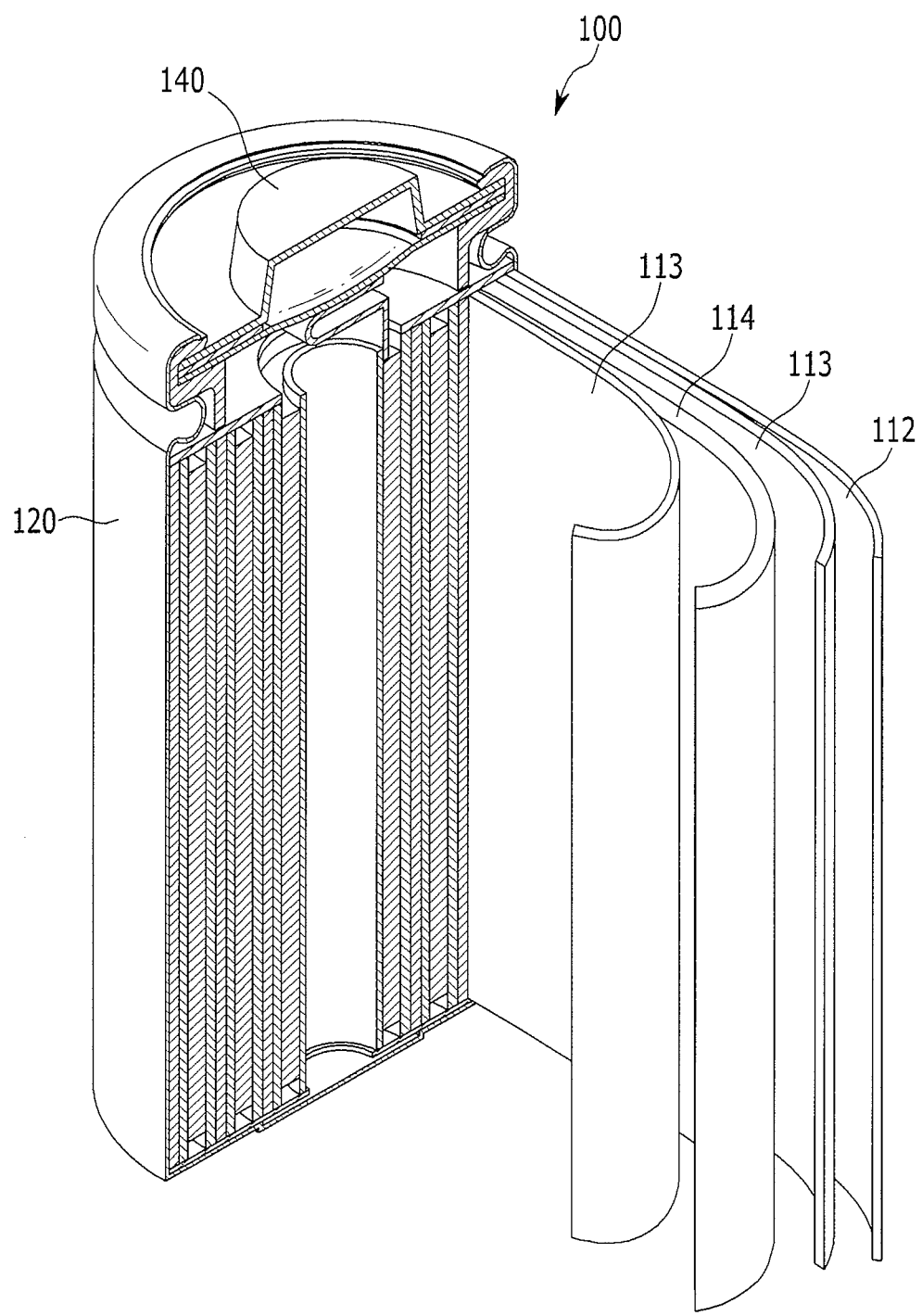
FIG. 1 is a schematic cross-sectional view of a rechargeable lithium battery according to an embodiment of the present invention.

According to embodiments of the present invention, an electrode for a rechargeable lithium battery includes an ionomer represented by a copolymer of a monomer represented by Chemical Formula 1. As used herein, the term "copolymer" refers to any type of copolymer, including random copolymers, block copolymers, etc. Also, as used herein, the term "monomer" refers to the moiety represented by Chemical Formula 1, even though that formula might be considered to include multiple monomers.

Chemical Formula 1

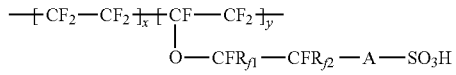

In Chemical Formula, each of x and y is independently an integer ranging from 1 to 100,000, and A is selected from —O—$(CFR_{f3}$—$CFR_{f4})$—, —$(CFR_{f5}$—$CFR_{f6})$—, and combinations of two or more thereof. Each of $R_{f1}$ to $R_{f6}$ is independently selected from fluorine, C1-C4 alkyls and C1-C4 fluorinated alkyls. In some exemplary embodiments, each of x and y is independently an integer ranging from 1 to 100. For example, in some embodiments, each of $R_{f1}$ to $R_{f6}$ is independently selected from fluorine, $CH_3$ and $CF_3$. In some exemplary embodiments, A may be a combination of two or more of —O—$(CFR_{f3}$—$CFR_{14})$—, —$(CFR_{f5}$—$CFR_{f6})$—. In some embodiments, for example, the monomer of Chemical Formula 1 is represented by Chemical Formula 2:

Chemical Formula 2

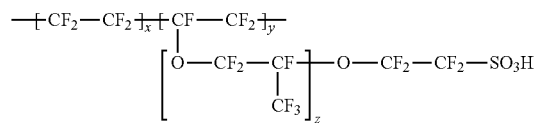

In Chemical Formula 2, A (from Chemical Formula 1) is —[O—$(CF_2$—$CFCF_3)]_{Z-1}$—[O—$(CF_2$—$CF_2)]$—, $R_{f1}$ is F, and $R_{f2}$ is $CF_3$. Also, in some embodiments, in Chemical Formula 2, x is an integer ranging from 3 to 20, y is an integer ranging from 1 to 10, and z is an integer ranging from 1 to 10. In some embodiments, for example, x may range from 6 to 15, y may range from 1 to 5, and z may range from 1 to 5.

Nonlimiting examples of suitable materials for the ionomer include Nafion N1110 (available from Dupont Co.), Nafion N117 (available from Dupont Co.), Nafion N115 (available from Dupont Co.), Nafion NR-212 (available from Dupont Co.), Nafion NR-211 (available from Dupont Co.), Nafion XL-100 (available from Dupont Co.), Nafion NR50 1100 EW (available from Dupont Co.), and combinations thereof.

According to embodiments of the present invention, the electrode for a rechargeable lithium battery includes a current collector and an active material layer formed on the current collector. The ionomer represented by a copolymer of the monomer of the above Chemical Formula 1 is mixed with the active material layer and included therein.

The electrode may be a positive electrode or a negative electrode. When the electrode is a positive electrode, the active material layer may be a positive active material layer including an ionomer represented by a copolymer of the monomer of the above Chemical Formula 1 and a positive active material. When the electrode is a negative electrode, the active material layer may be a negative active material layer including an ionomer represented by a copolymer of the monomer of the above Chemical Formula 1 and a negative active material.

For example, the active material layer may be formed by coating an active material composition on a current collector. The active material composition may include an ionomer represented by a copolymer of the monomer of the above Chemical Formula 1, an active material, a conductive material, a binder, and a solvent. The ionomer represented by a copolymer of the monomer of the above Chemical Formula 1 may be uniformly dispersed in the active material layer.

Figure 2:
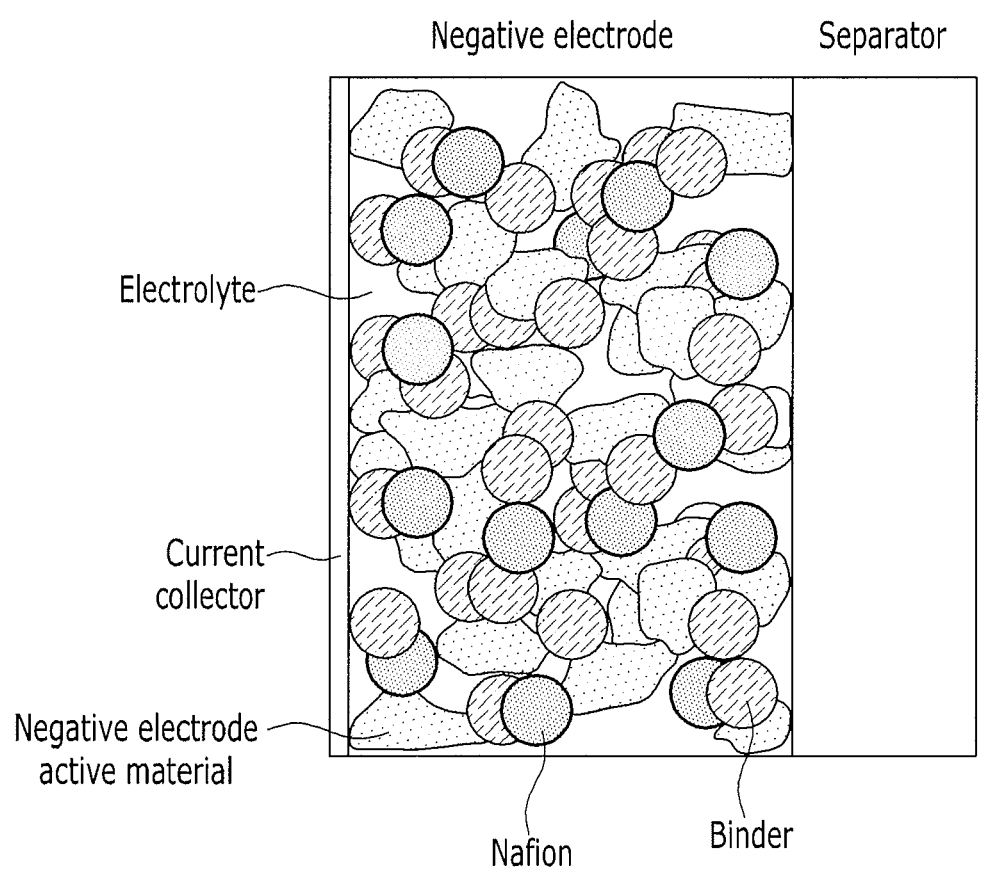
FIG. 2 is a partial cross-sectional schematic view of a rechargeable lithium battery including an electrode according to another embodiment of the present invention.

FIG. 2 is a partial cross-sectional schematic view of a rechargeable lithium battery including the electrode prepared according to this method.

According to another embodiment of the present invention, an active material layer is formed on a current collector by coating an active material composition (i.e., an active material, a conductive material, a binder, a solvent, and the like) on the current collector and then applying a solution including an ionomer represented by a copolymer of the monomer of the above Chemical Formula 1 on the active material layer, so that the solution including the ionomer may permeate the active material layer. Accordingly, the ionomer represented by a copolymer of the monomer of the above Chemical Formula 1 may be included in the active material layer.

The thickness of the coating layer formed by applying the solution including the ionomer may be from about 0.1% to about 10% of the thickness of the active material layer. When the thickness of the coating layer formed by applying the solution including the ionomer is less than about 0.1% of the thickness of the active material layer, it is not sufficient to trap the metal ions, such as transition metal ions and water. When the thickness of the coating layer formed by applying the solution including the ionomer is greater than about 10% of the thickness of the active material layer, it may adversely affect the movement of the lithium ions, and the capacity of the cell may be reduced as the total thickness of the electrode increases. Because the ionomer represented by a copolymer of the monomer of Chemical Formula 1 in the coating layer permeates the active material layer, a concentration gradient may be formed in which the concentration of the ionomer is greater toward the interface with the separator.

Figure 3:
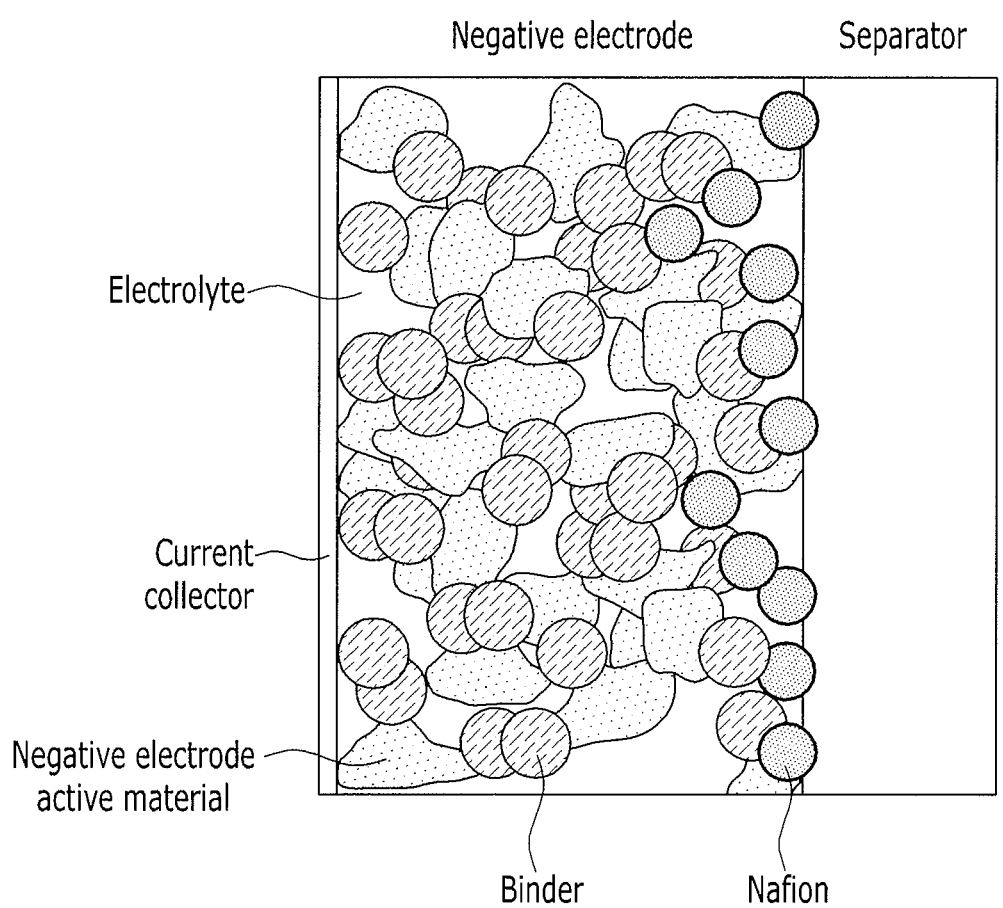
FIG. 3 is a partial cross-sectional schematic view of a rechargeable lithium battery including an electrode according to still another embodiment of the present invention.

FIG. 3 is a partial cross-sectional schematic view of a rechargeable lithium battery including the electrode prepared according to this method.

The ionomer represented by a copolymer of the monomer of the above Chemical Formula 1 is a fluorine-based copolymer including a sulfonic acid group, and is able to trap moisture and metal, thus mitigating growth of an SEI (Solid Electrolyte Interface) layer on the surface of the negative electrode. As a result, the rechargeable lithium battery may have improved cycle-life.

When the cycle-life of a rechargeable lithium battery is evaluated after the battery is allowed to stand, capacity decreases may be aggravated as the SEI layer becomes thicker and the negative electrode includes more metals. The metals at the negative electrode are eluted from the positive active material and move to the negative electrode. Moisture in the electrolyte may be one of the factors which cause the metals to be eluted from the positive active material. The metals or metal oxides thereof at the negative electrode may accelerate growth of the SEI layer on the negative electrode, thus decreasing the cycle-life of the rechargeable lithium battery.

A sulfonic acid group in the ionomer represented by a copolymer of the monomer of the above Chemical Formula 1 reacts with metal ions eluted from the positive active material and forms a salt therewith via an ion exchange reaction. In such a manner, the metal ions are trapped and less of them move toward the surface of the negative active material. For example, in the case of a monovalent metal ion, Reaction Scheme 1 (depicted below) may take place, and in the case of a divalent metal ion, Reaction Scheme 2 (depicted below) may be possible (See Nasef, et al., "Adsorption of some heavy metal ions from aqueous solutions on Nafion 117 membrane," Desalination, 249 (2009) 677-681, the entire content of which is incorporated herein by reference).

Reaction Scheme 1

Ionomer of Chemical Formula 1

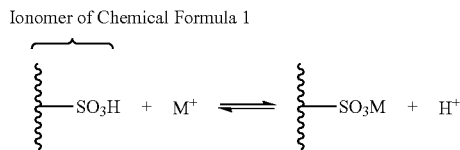

Reaction Scheme 2

Ionomer of Chemical Formula 1

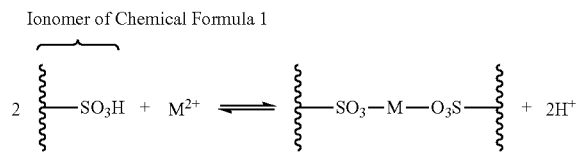

In Reaction Schemes 1 and 2, ∿∿ indicates the backbone of the ionomer represented by the above Chemical Formula 1, $M^+$ indicates a monovalent metal ion, and $M^{2+}$ indicates a divalent metal ion. Reaction Schemes 1 and 2 show the mechanisms by which the sulfone groups in the ionomer of the above Chemical Formula 1 reacts with $M^+$ or $M^{2+}$.

In addition, the sulfonic acid group of the ionomer represented by a copolymer of the monomer of the above Chemical Formula 1 absorbs moisture in the electrolyte. The sulfonic acid group of the ionomer has a hydrogen bond with $H_2O$, $H_3O^+$, and the like, and thus may include much moisture.

The ionomer represented by a copolymer of the monomer of the above Chemical Formula 1 may be included in an amount ranging from about 0.1 to about 10 parts by weight based on 100 parts by weight of the active material. When the ionomer is included in an amount within this range, it does not disturb the active material but exists on the surface of the active material, thereby accomplishing the aforementioned advantage.

The electrode may be a positive electrode or a negative electrode.

According to another embodiment of the present invention, a rechargeable lithium battery includes an electrode including an ionomer represented by a copolymer of the monomer of Chemical Formula 1, and a non-aqueous electrolyte.

The electrode may be a positive electrode or a negative electrode.

In general, rechargeable lithium batteries may be classified as lithium ion batteries, lithium ion polymer batteries, and lithium polymer batteries depending on the presence of a separator and the kind of electrolyte used therein. The rechargeable lithium battery may have a variety of shapes and sizes, and thus may include a cylindrical, prismatic, coin, or pouch-type battery, and may be thin film or bulky in size. The structure and fabricating method for a lithium ion battery according to the present invention are known in the art.

FIG. 1 is an exploded, cross-sectional, perspective schematic view of a structure of a rechargeable lithium battery. Referring to FIG. 1, the rechargeable lithium battery 100 includes a negative electrode 112, a positive electrode 114, a separator 113 between the negative electrode 112 and the positive electrode 114, an electrolyte (not shown) impregnating the separator 113, a battery case 120, and a sealing member 140 sealing the battery case 120. The rechargeable lithium battery 100 is fabricated by sequentially laminating a negative electrode 112, a positive electrode 114, and a separator 113, spirally winding them to form an electrode assembly, and housing the spiral-wound electrode assembly in the battery case 120.

The negative electrode includes a current collector and a negative active material layer formed on the current collector. The negative active material layer may include a negative active material. The negative active material layer may also include an ionomer represented by a copolymer of the monomer of Chemical Formula 1, which is discussed in detail above.

The negative active material may include a material that reversibly intercalates/deintercalates lithium ions, a lithium metal, a lithium metal alloy, a material capable of doping and dedoping lithium, or a transition metal oxide.

The material that can reversibly intercalate/deintercalate lithium ions may include a carbon material. The carbon material may be any carbon-based negative active material generally used in lithium ion rechargeable batteries. Nonlimiting examples of the carbon material include crystalline carbon, amorphous carbon, and mixtures thereof. The crystalline carbon may be non-shaped, or sheet, flake, spherical, or fiber-shaped natural graphite or artificial graphite. The amorphous carbon may be a soft carbon, a hard carbon, a mesophase pitch carbonized product, fired coke, and the like.

Nonlimiting examples of the lithium metal alloy include alloys of lithium with at least one metal selected from Na, K, Rb, Cs, Fr, Be, Mg, Ca, Sr, Si, Sb, Pb, In, Zn, Ba, Ra, Ge, Al, or Sn.

Nonlimiting examples of the material capable of doping lithium include Si, $SiO_x$ (where $0<x<2$), Si-Q alloys (where Q is an element selected from alkali metals, alkaline-earth metals, group 13 elements, group 14 elements, transition elements, rare earth elements, and combinations thereof, but Q is not Si), Sn, $SnO_2$, Sn—R alloys (where R is an element selected from alkali metals, alkaline-earth metals, group 13 elements, group 14 elements, transition elements, rare earth elements, and combinations thereof, but R is not Sn), and mixtures thereof. At least one of these materials may be mixed with $SiO_2$. In some embodiments, for example, Q and R may be independently selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, and combinations thereof.

Nonlimiting examples of the transition metal oxide include vanadium oxide, lithium vanadium oxide, and the like.

The negative active material layer may include a binder and optionally, a conductive material. The binder improves the binding properties of the negative active material particles to one another and to the current collector. Nonlimiting examples of the binder include polyvinyl alcohol, carboxymethyl cellulose, hydroxypropyl cellulose, diacetyl cellulose, polyvinylchloride, carboxylated polyvinylchloride, polyvinylfluoride, ethylene oxide-containing polymers, polyvinylpyrrolidone, polyurethane, polytetrafluoroethylene, polyvinylidenefluoride, polyethylene, polypropylene, styrene-butadiene rubbers, acrylated styrene-butadiene rubbers, epoxy resins, nylon, and the like, and combinations thereof.

The conductive material improves the electrical conductivity of the negative electrode. Any electrically conductive material can be used as a conductive agent, so long as it does not cause a chemical change. Nonlimiting examples of the conductive material include carbon-based materials such as natural graphite, artificial graphite, carbon black, acetylene black, ketjen black, carbon fibers, and the like; metal-based materials of a metal powder or a metal fiber including copper, nickel, aluminum, silver, and the like; conductive polymers such as polyphenylene derivatives, and the like; and mixtures thereof.

The current collector may include a copper foil, a nickel foil, a stainless steel foil, a titanium foil, a nickel foam, a copper foam, a polymer substrate coated with a conductive metal, or a combination thereof.

The positive electrode may include a current collector and a positive active material layer formed on the current collector. The positive active material layer may include an ionomer represented by a copolymer of the monomer of Chemical Formula 1, which is described in detail above.

The positive active material may include a lithiated intercalation compound that reversibly intercalates and deintercalates lithium ions. The positive active material may include a composite oxide including at least one selected from cobalt, manganese, and nickel, as well as lithium. Nonlimiting examples of suitable positive active materials include $Li_aA_{1-b}R_bD_2$ (where $0.90 \le a \le 1.8$ and $0 \le b \le 0.5$); $Li_aE_{1-b}R_bO_{2-c}D_c$ (where $0.90 \le a \le 1.8$, $0 \le b \le 0.5$ and $0 \le c \le 0.05$); $LiE_{2-b}R_bO_{4-c}D_c$ (where $0 \le b \le 0.5$, $0 \le c \le 0.05$); $Li_aNi_{1-b-c}Co_bR_cD_\alpha$ (where $0.90 \le a \le 1.8$, $0 \le b \le 0.5$, $0 \le c \le 0.05$ and $0 < \alpha \le 2$); $Li_aNi_{1-b-c}Co_bR_cO_{2-\alpha}Z_\alpha$ (where $0.90 \le a \le 1.8$, $0 \le b \le 0.5$, $0 \le c \le 0.05$ and $0 \le \alpha \le 2$); $Li_aNi_{1-b-c}Co_bR_cO_{2-\alpha}Z_2$ (where $0.90 \le a \le 1.8$, $0 \le b \le 0.5$, $0 \le c \le 0.05$ and $0 < \alpha < 2$); $Li_aNi_{1-b-c}Mn_bR_cD_\alpha$ (where $0.90 \le a \le 1.8$, $0 \le b \le 0.5$, $0 \le c \le 0.05$ and $0 < \alpha \le 2$); $Li_aNi_{1-b-c}Mn_bR_cO_{2-\alpha}Z_\alpha$ (where $0.90 \le a \le 1.8$, $0 \le b \le 0.5$, $0 \le c \le 0.05$ and $0 < \alpha < 2$); $Li_aNi_{1-b-c}Mn_bR_cO_{2-\alpha}Z_2$ (where $0.90 \le a \le 1.8$, $0 \le b \le 0.5$, $0 \le c \le 0.05$ and $0 < \alpha < 2$); $Li_aNi_bE_cG_dO_2$ (where $0.90 \le a \le 1.8$, $0 \le b \le 0.9$, $0 \le c \le 0.5$ and $0.001 \le d \le 0.1$); $Li_aNi_bCo_cMn_dG_eO_2$ (where $0.90 \le a \le 1.8$, $0 \le b \le 0.9$, $0 \le c \le 0.5$, $0 \le d \le 0.5$ and $0.001 \le e \le 0.1$); $Li_aNiG_bO_2$ (where $0.90 \le a \le 1.8$ and $0.001 \le b \le 0.1$); $Li_aCoG_bO_2$ (where $0.90 \le a \le 1.8$ and $0.001 \le b \le 0.1$); $Li_aMnG_bO_2$ (where $0.90 \le a \le 1.8$ and $0.001 \le b \le 0.1$); $Li_aMn_2G_bO_4$ (where $0.90 \le a \le 1.8$ and $0.001 \le b \le 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ (where $0 \le f \le 2$); $Li_{(3-f)}Fe_2(PO_4)_3$ (where $0 \le f \le 2$); and $LiFePO_4$.

In the above Chemical Formulae, A may be Ni, Co, Mn, or a combination thereof; R may be Al, Ni, Co, Mn, Cr, Fe, Mg, Sr, V, a rare earth element, or a combination thereof; D may be O, F, S, P, or a combination thereof; E may be Co, Mn, or a combination thereof; Z may be F, S, P, or a combination thereof; G may be Al, Cr, Mn, Fe, Mg, La, Ce, Sr, V, or a combination thereof; Q may be Ti, Mo, Mn, or a combination thereof; T may be Cr, V, Fe, Sc, Y, or a combination thereof; and J may be V, Cr, Mn, Co, Ni, Cu, or a combination thereof.

The positive active material may be a compound with a coating layer on the surface of the active material, or a mixture of the active material and a compound with a coating layer element. The coating layer may include at least one coating element compound selected from oxides and hydroxides of the coating element, oxyhydroxides of the coating element, oxycarbonates of the coating element, and hydroxycarbonates of the coating element. The compound for the coating layer may be either amorphous or crystalline. The coating element included in the coating layer may be selected from Mg, Al, Co, K, Na, Ca, Si, Ti, V, Sn, Ge, Ga, B, As, Zr, and mixtures thereof. The coating process may include any conventional processes so long as it does not cause any side effects on the properties of the positive active material (e.g., spray coating, immersing). These processes are known to those having ordinary skill in this art.

The positive active material layer may further include a binder and a conductive material. The binder improves the binding properties of the positive active material particles to one another and to the current collector. Nonlimiting examples of the binder include polyvinyl alcohol, carboxymethyl cellulose, hydroxypropyl cellulose, diacetyl cellulose, polyvinylchloride, carboxylated polyvinylchloride, polyvinylfluoride, ethylene oxide-containing polymers, polyvinylpyrrolidone, polyurethane, polytetrafluoroethylene, polyvinylidenefluoride, polyethylene, polypropylene, styrene-butadiene rubbers, acrylated styrene-butadiene rubbers, epoxy resins, nylon, and the like, and combinations thereof.

The conductive material improves the electrical conductivity of the positive electrode. Any electrically conductive material can be used as the conductive agent so long as it does not cause a chemical change. Nonlimiting examples of the conductive material include natural graphite, artificial graphite, carbon black, acetylene black, ketjen black, carbon fibers, metal powders or metal fibers including copper, nickel, aluminum, silver, polyphenylene derivatives, and the like, and combinations thereof.

The current collector may be Al but is not limited thereto.

The negative and positive electrodes may be fabricated by a method including preparing an active material composition by mixing the active material, a conductive material, and a binder, and coating the composition on a current collector. The electrode manufacturing method is known. The solvent may include N-methylpyrrolidone, or the like, but is not limited thereto.

The electrolyte may include a non-aqueous organic solvent and a lithium salt. The non-aqueous organic solvent serves to transmit ions taking part in the electrochemical reaction of the battery. Nonlimiting examples of the non-aqueous organic solvent include carbonate-based solvents, ester-based solvents, ether-based solvents, ketone-based solvents, alcohol-based solvents, and aprotic solvents. Nonlimiting examples of the carbonate-based solvent include dimethylcarbonate (DMC), diethylcarbonate (DEC), dipropylcarbonate (DPC), methylpropylcarbonate (MPC), ethylpropylcarbonate (EPC), ethylmethylcarbonate (EMC), ethylenecarbonate (EC), propylenecarbonate (PC), butylenecarbonate (BC), and the like. Nonlimiting examples of the ester-based solvent include methylacetate, ethylacetate, n-propylacetate, dimethylacetate, methylpropionate, ethylpropionate, γ-butyrolactone, decanolide, valerolactone, mevalonolactone, caprolactone, and the like. Nonlimiting examples of the ether-based solvent include dimethyl ether, dibutyl ether, tetraglyme, diglyme, dimethoxyethane, 2-methyltetrahydrofuran, tetrahydrofuran (THF), and the like. Nonlimiting examples of the ketone-based solvent include cyclohexanone, and the like. Nonlimiting examples of the alcohol-based solvent include ethanol, isopropylalcohol, and the like. Nonlimiting examples of the aprotic solvent include nitriles (such as R—CN (wherein R is a C2 to C20 linear, branched, or cyclic hydrocarbon, and may include one or more double bonds, one or more aromatic rings, or one or more ether bonds)), amides (such as dimethylformamide, dimethylacetamide), dioxolanes (such as 1,3-dioxolane), sulfolanes, and the like.

The non-aqueous organic solvent may include a single solvent or a mixture of solvents. When a mixture of organic solvents is used, the mixture ratio can be controlled in accordance with the desired battery performance.

In some embodiments, for example, the carbonate-based solvent may include a mixture of a cyclic carbonate and a linear carbonate. The cyclic carbonate and the chain carbonate may be mixed together in a volume ratio of about 1:1 to about 1:9, and when used as the electrolyte, the electrolyte may have enhanced performance.

In addition, the electrolyte may be prepared by further adding an aromatic hydrocarbon-based solvent to the carbonate-based solvent. The carbonate-based solvent and the aromatic hydrocarbon-based solvent may be mixed together in a volume ratio of about 1:1 to about 30:1.

The aromatic hydrocarbon-based organic solvent may be represented by the following Chemical Formula 3.

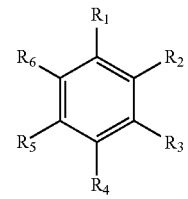

Chemical Formula 3

In Chemical Formula 3, each of $R_1$ to $R_6$ is independently selected from hydrogen, halogens, C1 to C10 alkyl groups, C1 to C10 haloalkyl groups, and combinations thereof.

Nonlimiting examples of the aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous electrolyte may further include vinylene carbonate or an ethylene carbonate-based compound represented by the following Chemical Formula 4 in order to improve the cycle-life of the battery.

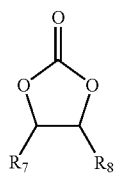

Chemical Formula 4

In Chemical Formula 4, each of $R_7$ and $R_8$ is independently selected from hydrogen, halogens, cyano (CN) groups, nitro ($NO_2$) groups, and C1 to C5 fluoroalkyl groups, provided that at least one of $R_7$ and $R_8$ is a halogen, a cyano (CN), a nitro ($NO_2$), or a C1 to C5 fluoroalkyl (i.e., at least one of $R_7$ and $R_8$ is not hydrogen).

Nonlimiting examples of the ethylene carbonate-based compound include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and combinations thereof. The amount of the vinylene carbonate or the ethylene carbonate-based compound for improving cycle life may be adjusted within an appropriate range.

The lithium salt is dissolved in the non-aqueous solvent and supplies the lithium ions in the rechargeable lithium battery, enables the basic operation of the rechargeable lithium battery, and improves lithium ion transfer between the positive and negative electrodes. The lithium salt may include at least one supporting salt selected from $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (wherein, x and y are natural numbers), LiCl, LiI, $LiB(C_2O_4)_2$ (lithium bis(oxalato)borate, LiBOB), and combinations thereof. The lithium salt may be used in a concentration of about 0.1 to about 2.0M. When the lithium salt is included within the above concentration range, electrolyte performance and lithium ion mobility may be enhanced due to optimal electrolyte conductivity and viscosity.

The rechargeable lithium battery may further include a separator between the negative electrode and the positive electrode, as needed. Nonlimiting examples of the separator include polyethylene, polypropylene, polyvinylidene fluoride, and multi-layers thereof, such as a polyethylene/polypropylene double-layered separator, a polyethylene/polypropylene/polyethylene triple-layered separator, and a polypropylene/polyethylene/polypropylene triple-layered separator.

EXAMPLES

The following examples are presented for illustrative purposes only, and doe not limit the scope of the present invention.

Example 1

A graphite active material, an aramide-based binder, and Nafion117 (available from DuPont Co.) were mixed in a weight ratio of 94:5.5:0.5 in water to prepare a negative active material slurry. The negative active material slurry was coated on a copper current collector and then dried, compressed, and the like, thereby fabricating a negative electrode.

Comparative Example 2

A negative electrode was fabricated as in Example 1 except no Nafion was used in the negative active material slurry.

Example 2

The negative electrode according to Example 1 was used to fabricate a 18650 circular battery cell. $LiMn_2O_4$ was used as the positive electrode. A separator was positioned between the negative and positive electrodes, as shown in FIG. 1. Then, the electrodes and the separator were spiral-wound to form an electrode assembly, and then the electrode assembly was inserted in a battery case. Then, an electrolyte solution was impregnated in the case. The case was sealed, thereby fabricating a battery cell. The electrolyte solution was prepared by mixing EC (ethylenecarbonate)/DMC (dimethylcarbonate)/EMC (ethylmethylcarbonate) at a ratio of 3/4/3, and adding 5 vol % of a FEC (fluoroethylenecarbonate) additive.

Example 3

A 18650 circular battery cell was fabricated according to the same method as Example 2, except that Nafion 117 (from DuPont Co.) was used in the positive active material slurry instead of the negative active material slurry. Specifically, $LiMn_2O_4$, a binder, a conductive material and Nafion 117 were mixed in a weight ratio of 96:1.5:2:0.5 to prepare the positive active material slurry.

Example 4

A negative active material slurry was prepared as in Example 2, expect no Nafion was included in the negative active material slurry. Specifically, the negative active material slurry was coated on the current collector of the negative electrode to form a negative active material layer having a thickness of 100 μm, and then a Nafion 117 solution was spray coated on the negative active material layer at a thickness of 300 nm. The Nafion 117 solution was prepared with a 15 wt % concentration of Nafion using 1-propanol and water as a mixed solvent. Otherwise, the same method as Example 2 was used to fabricate the 18650 circular battery cell.

Example 5

A positive active material slurry was prepared as in Example 3, expect no Nafion was included in the negative active material slurry. Specifically, the positive active material slurry was coated on the current collector of the positive electrode to form a positive active material layer having a thickness of 100 μm, and then a Nafion 117 solution was spray coated on the positive active material layer at a thickness of 300 nm. The Nafion 117 solution was prepared with a 15 wt % concentration of Nafion using 1-propanol and water as a mixed solvent. Otherwise, the same method as Example 3 was used to fabricate the 18650 circular battery cell.

Comparative Example 2

A 18650 circular battery cell was fabricated as in Example 2, except that the negative electrode of Comparative Example 1 was used.

Figure 4:
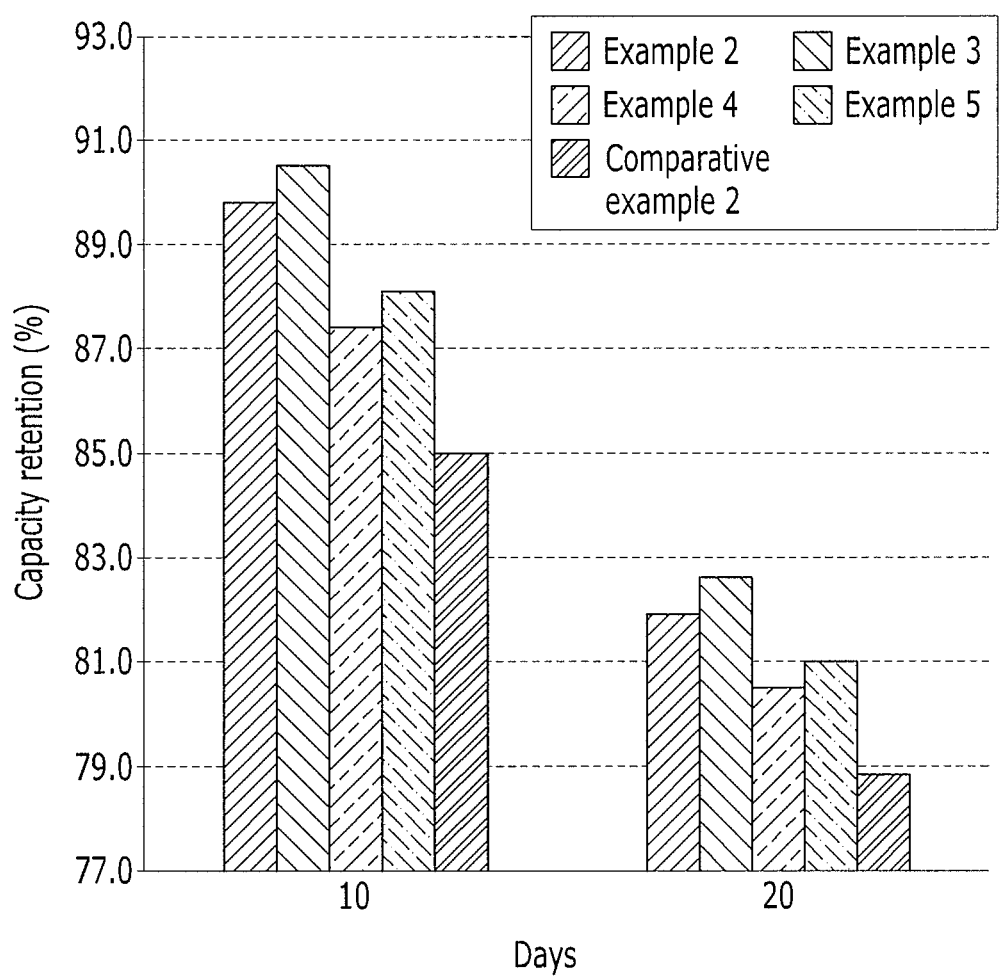
FIG. 4 is a graph comparing the high temperature cycle-life characteristics of the rechargeable lithium batteries prepared according to Examples 2 through 5 and Comparative Example 2.

The rechargeable lithium battery cells according to Examples 2 through 5 and Comparative Example 2 were allowed to stand at a high temperature and their cycle-life characteristics were evaluated. The results are shown in FIG. 4.

The evaluation of cycle-life characteristics by allowing a battery to stand at a high temperature is a method of accelerating the evaluation of cycle-life by shortening the evaluation time needed to obtain the degradation tendency of the cell at a high temperature. The evaluation is performed by allowing a fabricated battery cell to stand in a 60° C. charging and discharging device and measuring the capacity deterioration rate against the initial capacity at desired periods (e.g., 10 days). The time period may be determined by the degradation tendency of the battery.

While certain exemplary embodiments have been described, those of ordinary skill in the art will understand that certain modifications and changes to the described

What is claimed is:

1. An electrode for a lithium rechargeable battery, comprising:
   an active material layer comprising an electrode active material; and
   a coating layer on the active material layer, the coating layer comprising a copolymer of a monomer represented by Formula 1 coated directly on the active material layer such that the active material layer comprises the copolymer permeated into the electrode active material:

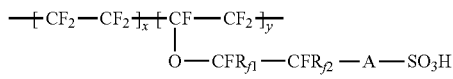

Formula 1 wherein:
A is a moiety selected from the group consisting of —O—(CFR$_{f3}$—CFR$_{f4}$)—, —(CFR$_{f5}$—CFR$_{f6}$)—, and combinations of two or more thereof,
each of R$_{f1}$ through R$_{f6}$ is independently selected from the group consisting of fluorine, C1-C4 alkyls, and fluorinated C1-C4 alkyls,
each of x and y is independently an integer ranging from 1 to 100,000, and
wherein the copolymer is present in an amount of about 0.1 to about 0.5 parts by weight based on 100 parts by weight of the electrode active material, and
the copolymer is present in the active material layer at a greater concentration toward an interface with the coating layer.

2. The electrode of claim 1, wherein the monomer is represented by Formula 2:

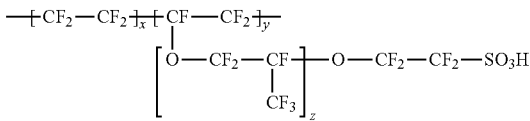

Formula 2 wherein:
x is an integer ranging from 3 to 20,
y is an integer ranging from 1 to 10, and
z is an integer ranging from 1 to 10.

3. The electrode of claim 1, wherein the electrode active material comprises a positive active material.

4. The electrode of claim 3, wherein the positive active material comprises a lithium manganese-based oxide.

5. The electrode of claim 1, wherein the electrode active material comprises a negative active material.

6. An electrode for a lithium rechargeable battery, comprising:
   an active material layer comprising an electrode active material; and
   a coating layer on the active material layer, the coating layer comprising a copolymer of a monomer represented by Formula 1 coated directly on the active material layer such that the active material layer comprises the copolymer permeated into the electrode active material:

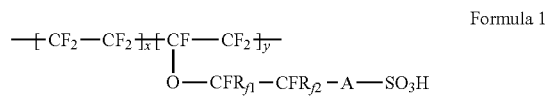

Formula 1 wherein:
A is a moiety selected from the group consisting of —O—(CFR$_{f3}$—CFR$_{f4}$)—, —(CFR$_{f5}$—CFR$_{f6}$)—, and combinations of two or more thereof,
each of R$_{f1}$ through R$_{f6}$ is independently selected from the group consisting of fluorine, C1-C4 alkyls, and fluorinated C1-C4 alkyls,
each of x and y is independently an integer ranging from 1 to 100,000, and
wherein the copolymer is present in an amount of about 0.1 to about 0.5 parts by weight based on 100 parts by weight of the electrode active material, and a thickness of the coating layer is about 0.1% to about 10% of a thickness of the active material layer.

7. A lithium rechargeable battery, comprising:
a first electrode comprising the electrode of claim 1;
a second electrode;
a separator; and
an electrolyte.

8. The lithium rechargeable battery of claim 7, wherein the monomer is represented by Formula 2:

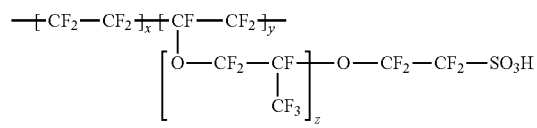

Formula 2 wherein:
x is an integer ranging from 3 to 20,
y is an integer ranging from 1 to 10, and
z is an integer ranging from 1 to 10.

9. The lithium rechargeable battery of claim 7, wherein the electrode active material of the first electrode comprises a positive active material.

10. The lithium rechargeable battery of claim 9, wherein the positive active material is a lithium manganese-based oxide.

11. The lithium rechargeable battery of claim 7, wherein the second electrode comprises a second electrode active material comprising a negative active material.

12. The lithium rechargeable battery of claim 7, wherein a thickness of the coating layer is about 0.1% to about 10% of a thickness of the active material layer.

13. An electrode for a lithium rechargeable battery, comprising an active material layer comprising a mixture of:
an electrode active material;
a coating layer comprising a copolymer of a monomer represented by Formula 1 coated directly on the electrode active material:

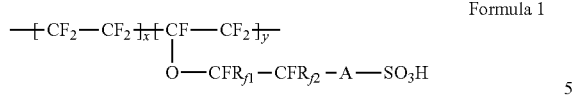

Formula 1 wherein:
A is a moiety selected from the group consisting of —O—(CFR$_{f3}$—CFR$_{f4}$)—, —(CFR$_{f5}$—CFR$_{f6}$)—, and combinations of two or more thereof,
each of R$_{f1}$ through R$_{f6}$ is independently selected from the group consisting of fluorine, C1-C4 alkyls, and fluorinated C1-C4 alkyls, and
each of x and y is independently an integer ranging from 1 to 100,000; and
a binder present in an amount greater than an amount of the copolymer such that a ratio of the amount of the binder to the amount of the copolymer is 3:1 or greater,
wherein the copolymer is present in an amount of about 0.1 to about 0.5 parts by weight based on 100 parts by weight of the electrode active material, and a thickness of the coating layer is about 0.1% to about 10% of a thickness of the active material layer.

14. The electrode of claim 13, wherein the binder is present in an amount of about 1.5 to about 5.5 wt % based on 100 wt % of the mixture.

\* \* \* \* \*